Figure 1:
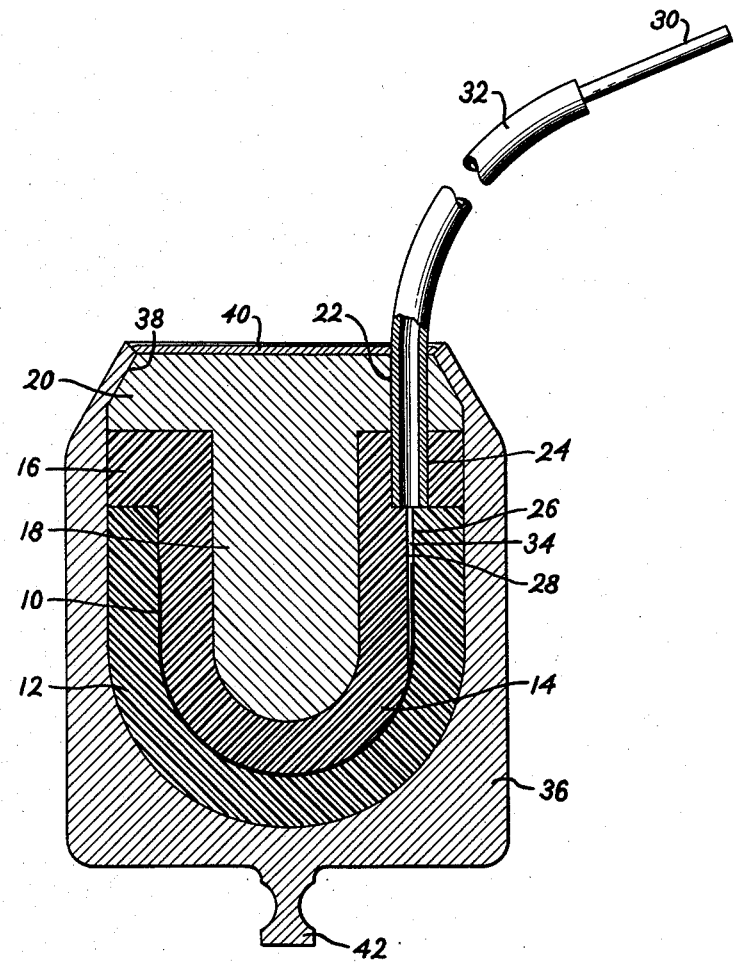

March 29, 1960  H. C. LIEB  2,930,909
RADIOACTIVE BATTERY WITH SOLID DIELECTRIC
SPACERS AND METHOD OF MANUFACTURE
Filed Nov. 23, 1954

INVENTOR.
HARRY C. LIEB
BY
ATTORNEY

United States Patent Office 2,930,909
Patented Mar. 29, 1960

2,930,909

RADIOACTIVE BATTERY WITH SOLID DIELECTRIC SPACERS AND METHOD OF MANUFACTURE

Harry C. Lieb, Rockville Centre, N.Y., assignor to Leesona Corporation, a corporation of Massachusetts Application November 23, 1954, Serial No. 470,566

15 Claims. (Cl. 310—3)

The present invention relates to the generation of electrical energy and more particularly relates to an apparatus for utilizing the electrical energy of nuclear reactions and the method of manufacturing such apparatus.

Radioactive materials emit alpha-particles or beta-particles, or both, in the course of their nuclear reactions. The alpha-particles are positively charged and the beta-particles are negatively charged and the energies of these particles may be several million electron volts. In the past devices have been made to utilize directly the electrical energy of these particles by placing a collector electrode or electrodes adjacent a supply of radioactive material to collect the charged particles and to thereby build up a potential between the radioactive material and said collector electrode. These devices have been unreliable and inefficient in performance, expensive, relatively large in size, easily broken, and constitute a hazard to the health of personnel who make or use them.

It is accordingly one object of the present invention to provide a compact and efficient device for utilizing directly the electrical energy from a nuclear reaction.

Another object of the present invention is to provide a device for utilizing directly the electrical energy of nuclear reactions wherein the electrons emitted from a radioactive material are collected in a highly efficient manner.

Another object of the present invention is to provide a device for utilizing directly the electrical energy of nuclear reactions that is dependable and which can be produced in large quantities at reasonable cost.

Another object of the present invention is to provide a device for utilizing directly the electrical energy from a nuclear reaction that is rugged and which will continue to function under extreme conditions of temperature and/or shock.

Another object of the present invention is to provide a device for utilizing directly the electrical energy from a nuclear reaction that can be safely manufactured and which will not endanger the health of personnel using it.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which is a sectional view of a preferred embodiment of the present invention.

The device of the present invention for directly utilizing the electrical energy of nuclear reactions will be referred to hereinafter as a radioactive battery. The present battery comprises a supply of radioactive material, preferably strontium 90, that is a beta emitter encased in a solid dielectric which in turn is enclosed in an electron collector. A lead is connected to the radioactive material and becomes the positive terminal of the battery and a terminal is provided on the collector element which becomes the negative battery terminal.

The method of the present invention includes the steps of depositing the radioactive material in the unit in solution and evaporating the solvent and bonding the dielectric material together around the radioactive material.

Referring now to the drawing, one embodiment of the radioactive battery of the present invention comprises a thin walled cup 10 preferably stamped from copper foil. The inner surface of cup 10 is provided with a thin coating of radioactive material which preferably includes strontium 90 in the form of strontium chloride. Cup 10 has a substantially cylindrical side wall and a spherical bottom wall and is mounted in a solid dielectric element 12, preferably polystyrene, that has the same configuration as cup 10. The wall thickness of dielectric element 12 is substantially uniform throughout the element and its side walls extend above the top of cup 10 a distance slightly greater than the thickness of said dielectric. A second solid dielectric element 14, also preferably polystyrene, is nested inside of cup 10 and dielectric element 12. Dielectric element 14 is also generally cup shape and conforms to the inside of cup 10 and element 12. The wall thickness of dielectric element 14 is substantially equal to the wall thickness of element 12 and its outside diameter is such that it fits snugly inside of cup 10 and element 12. The uppermost end of element 14 is provided with an outwardly extending flange or lip 16 that extends outwardly over the top of said dielectric element 12. The two dielectric elements 12 and 14 are fused together along their contiguous side walls above cup 10 and along the top of element 12 and the under surface of flange 16 to seal the contained radioactive material therebetween against any possibility of escape.

A collector plug 18, preferably formed of brass, snugly fits inside of dielectric element 14 and is provided at its uppermost end with an outwardly extending flange 20 that engages the uppermost surface of dielectric flange 16. Aligned openings 22 and 24 are provided in flanges 20 and 16 respectively in substantial alignment with the side wall of cup 12 and mating channels 26 and 28 are aligned with said openings 22 and 24. A wire 30, preferably of tinned copper, provided with insulation 32 that preferably is polymonochlorotrifluorethylene ("Kel-F"), is connected to cup 10 and the radioactive material carried thereby by extending through openings 22 and 24 and having its bare end 34, swaged to fit in channels 26 and 28, held in contact with said cup and strontium 90 by dielectric elements 12 and 14.

The above described elements, i.e. cup 10 and the contained radioactive material, dielectric elements 12 and 14, collector plug 18 and wire 30 are mounted in a collector case 36, preferably brass, that is generally cylindrical in shape and provided with a cup-shaped recess that conforms to the outer surface of dielectric element 12, dielectric flange 16 and collector plug flange 20. Collector plug flange 20 is bevelled along its upper edge as shown at 38 and the upper edge of case 36 is rolled over the bevel to secure the unit together. The joint between case 36 and flange 20 not only secures said case and plug together mechanically but also connects these two elements electrically so that together they function as a collector electrode. In addition to the mechanical connection between case 36 and flange 20 the joint therebetween, and also between insulation 32 and flange 20 is sealed with a layer of thermo-setting plastic 40 that advantageously can be epoxy resin. A terminal 42 is formed on the base of case 36 and together with wire 30 provides the means for connecting the battery of the present invention to an electrical circuit.

The above described apparatus functions in the following manner. Electrons emitted by the radioactive material carried by cup 10 pass through dielectric material 12 and 14 and into collector plug 18 and collector case 36 giving those two units a negative charge. The cup shape of emitter electrode 10 and the radioactive material carried thereby is highly efficient and permits a much higher percentage of the electrons to reach a collector electrode than has been possible in radioactive batteries heretofore known. At the same time the loss of the electron from the radioactive material and cup 10 leaves these elements with a positive charge. Therefore, when terminal 42 and wire 30 are connected, electrical energy will flow from said terminal 42 to said wire 30. The thickness of dielectric members 12 and 14 is such that the electrons emitted from the radioactive material can pass therethrough and enter either collector plug 18 or collector case 36. However, they must be thick enough to prevent backscattered secondary electrons from either said collector plug or case from passing back therethrough to the cup 10. The wall thickness of collector case 36 is such that all electrons that pass through dielectric material 12 will be absorbed by said case thus preventing any of them from passing completely out of the radioactive battery. Polymonochlorotrifluoroethylene, the material employed to insulate wire 30 is preferred because it does not absorb moisture and will not transmit moisture vapor. However, this material is deteriorated by beta radiation and therefore said insulation terminates adjacent the upper end of dielectric material 12. This distance is sufficiently remote from the radioactive material, which extends only part way up the wall of cup 10, that substantially no beta particles can penetrate dielectric material 12 and 14 to reach it.

The above described radioactive battery is preferably manufactured in the following manner. Collector case 36 and collector plug 18 may be cast or machined, dielectric elements 12 and 14 are preferably moulded to shape and electrode cup 10 is preferably formed by a drawing operation. Electrode cup 10 is first assembled in the outer dielectric member 12 and the assembled cup and dielectric is inserted in collector case 36. Following this assembly, the radioactive material is introduced into cup 10 in solution. When strontium 90 is employed as the radioactive material, strontium chloride in acid solution is introduced into said cup. Very accurate control of the quantity of radioactive material deposited is possible by this method inasmuch as the concentration of the solution can be determined with great accuracy and a dilute solution is preferably introduced into cup 10 by means of a pipette. The unit as thus far assembled and containing the radioactive solution in cup 10 is then subjected to a drying operation to evaporate the solvent to leave a thin deposit of radioactive material on the inner surface of cup 10. Obviously heat and/or a vacuum can be used in this evaporating step.

Dielectric 14 and collector plug 18 are next assembled. Wire 30 is passed through aligned openings 22 and 24 and the dielectric and collector plug assembly is then positioned in collector case 36 with the swaged end 34 of wire 30 against the radioactive material and the inner surface of cup 10. The entire assembly is then heated to a temperature above the fusion temperature of dielectric elements 12 and 14 and pressure is applied to plug 18 to cause the two dielectric elements to conform completely to the shape of collector case 36, emitter cup 10, plug 18 and the swaged end 34 of wire 30. The pressure on plug 18 also causes the two dielectric elements to bond together at their cylindrical walls above cup 10 and at the upper end of element 12 and the flange of element 14 to thereby effectively seal the radioactive material between said dielectric elements. Following the heating and pressure applying and bonding steps, the unit is cooled and the upper edge of collector cup 36 is rolled inwardly to mechanically lock the assembly together and to give a good electrical connection between the two collector elements. A small quantity of thermosetting plastic is deposited in the upper end of the newly formed battery in the receptacle formed by the inturned upper edge of case 36 and the unit is subjected to enough heat to cause the plastic to polymerize and to thereby provide an additional seal to the unit.

A specific example of a device including the features set forth above was constructed with the components thereof having the following proportions:

| | |
|---|---|
| Diameter of copper emitter cup ____inches__ | .298 |
| Wall thickness of emitter cup _____do____ | .00067 |
| Height of emitter cup _____do____ | .250 |
| Wall thickness of brass collector case _do____ | .040 |
| Thickness of polystyrene dielectric __do____ | .010–.060 |
| $Sr^{90} Cl_2$ radioactive material ____millicuries__ | 1 |

The battery thus constructed used the kinetic energy of the beta particles emitted from the radioactive material to build up to an equilibrium voltage of approximately 7,500 volts at $4\times10^{-12}$ amperes. The amperes will increase in a linear fashion as the quantity of radioactive material is increased up to about 4 mc. The amperes fall off somewhat after 4 mc. of radioactive material is exceeded due to secondary radiation and self absorption.

The radioactive battery and the method by which it is manufactured has been described hereinabove as employing an emitter cup or electrode to hold and position the radioactive material. It should be pointed out, however, that in some instances the emitter cup can be dispensed with and the radioactive material deposited directly on the inner surface of dielectric element 12.

Since certain changes may be made in the above process and apparatus without departing from the scope of the invention herein involved, it is intended that all matter contained in the above description or shown in the accompanying drawing shall be interpreted as illustrative and not in a limiting sense.

What is claimed is:

1. A radioactive battery comprising a cup-shaped radioactive material having a substantially cylindrical side wall and substantially semispherical bottom wall, an electrically conducting collector case enclosing said material and spaced a substantially uniform predetermined distance from the outside thereof, an electrically conductive collector plug secured to said case and substantially uniformly spaced said predetermined distance from the inside of said material, said case and plug forming a collector electrode, the space between said material and said case and between said material and said plug being filled with a solid dielectric, said solid dielectric being in close contact with said radioactive material, the inner surface of said collector case and said collector plug, and a lead insulated from said collector connected to said material and extending therefrom to outside of said case, said predetermined distance being such that charged particles can pass from said material through said dielectric material to said collector electrode but backscattered secondary electrons will be absorbed by said dielectric in the event they are reflected by said collector electrode.

2. A radioactive battery comprising a cup-shaped emitter electrode, having a substantially cylindrical side wall and substantially semi-spherical bottom wall, a coating of radioactive material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said radioactive material, emitter electrode, the inner surface of said collector case and said collector plug, and a lead insulated from said collector connected to said emitter and extending therefrom to outside of said case, said predetermined distance being such that charged particles can pass from said emitter through said dielectric material to said collector electrode but backscattered secondary electrons will be absorbed by said dielectric in the event they are reflected by said collector electrode.

3. A radioactive battery comprising a cup-shaped radioactive material having a substantially cylindrical side wall and substantially semispherical bottom wall, an electrically conducting collector case enclosing said material and spaced a substantially uniform predetermined distance from the outside thereof, an electrically conductive collector plug secured to said case and substantially uniformly spaced said predetermined distance from the inside of said material, said case and plug forming a collector electrode, the space between said material and said case and between said material and said plug being filled with a solid dielectric, said solid dielectric being in close contact with said radioactive material, the inner surface of said collector case and said collector plug, and a lead insulated from said collector connected to said material and extending therefrom to outside of said case, said predetermined distance being such that charged particles can pass from said material through said dielectric material to said collector electrode but backscattered secondary electrons will be absorbed by said dielectric in the event they are reflected by said collector electrode, said collector case having walls capable of preventing any charged particles from passing therethrough.

4. A radioactive battery comprising a cup-shaped emitter electrode having a substantially cylindrical side wall and substantially semi-spherical bottom wall, a coating of radioactive material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said radioactive material, emitter electrode, the inner surface of said collector case and said collector plug, and a lead insulated from said collector connected to said emitter and extending therefrom to outside of said case, said predetermined distance being such that charged particles can pass from said emitter through said dielectric material to said collector electrode but backscattered secondary electrons will be absorbed by said dielectric in the event they are reflected by said collector electrode, said collector case having walls capable of preventing any charged particles from passing therethrough.

5. A radioactive battery comprising a cup-shaped radioactive material having a substantially cylindrical side wall and substantially semispherical bottom wall, an electrically conducting collector case enclosing said material and spaced a substantially uniform predetermined distance from the outside thereof, an electrically conductive collector plug secured to said case and substantially uniformly spaced said predetermined distance from the inside of said material, said case and plug forming a collector electrode, the space between said material and said case and between said material and said plug being filled with a solid dielectric, and a lead insulated from said collector connected to said material and extending therefrom to outside of said case, said dielectric being bonded together around said material and being in close contact with said material, the inner surface of said collector case and said collector plug, said predetermined distance being such that charged particles can pass from said material through said dielectric material to said collector electrode but backscattered secondary electrons will be absorbed by said dielectric in the event they are reflected by said collector electrode.

6. A radioactive battery comprising a cup-shaped emitter electrode having a substantially cylindrical side wall and substantially semi-spherical bottom wall, a coating of radioactive material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, and a lead insulated from said collector connected to said emitter and extending therefrom to outside of said case, said dielectric being bonded together around said emitter and being in close contact with said radioactive material, emitter electrode, the inner surface of said collector case and said collector plug, said predetermined distance being such that charged particles can pass from said emitter through said dielectric material to said collector electrode but backscattered secondary electrons will be absorbed by said dielectric in the event they are reflected by said collector electrode.

7. A radioactive battery comprising a cup-shaped radioactive material having a substantially cylindrical side wall and substantially semispherical bottom wall, an electrically conducting collector case enclosing said material and spaced a substantially uniform predetermined distance from the outside thereof, an electrically conductive collector plug secured to said case and substantially uniformly spaced said predetermined distance from the inside of said material, said case and plug forming a collector electrode, the space between said material and said case and between said material and said plug being filled with a solid dielectric, and a lead insulated from said collector connected to said material and extending therefrom to outside of said case, said dielectric being bonded together around said material and being in close contact with said material, the inner surface of said collector case and said collector plug, said predetermined distance being such that charged particles can pass from said emitter through said dielectric material to said collector electrode but backscattered secondary electrons will be absorbed by said dielectric in the event they are reflected by said collector electrode, said collector case having walls capable of preventing any charged particles from passing therethrough.

8. A radioactive battery comprising a cup-shaped emitter electrode having a substantially cylindrical side wall and substantially semi-spherical bottom wall, a coating of radioactive material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, and a lead insulated from said collector connected to said emitter and extending therefrom to outside of said case, said dielectric being bonded together around said emitter and being in close contact with said radioactive material, emitter electrode, the inner surface of said collector case and said collector plug, said predetermined distance being such that charged particles can pass from said emitter through said dielectric material to said collector electrode but backscattered secondary electrons will be absorbed by said dielectric in the event they are reflected by said collector electrode, said collector case having walls capable of preventing any charged particles from passing therethrough.

9. A radioactive battery comprising a radioactive beta emitter having a cup-like shape having a substantially cylindrical side wall and substantially semispherical bottom wall, an electrically conducting collector case enclosing said emitter and space a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said beta emitter, the inner surface of said collector case and said collector plug, and a lead insulated from said collector connected to said emitter and extending therefrom to outside of said case, said predetermined distance being such that beta particles can pass from said emitter through said dielectric material to said collector electrode but backscattered secondary electrons will be absorbed by said dielectric in the event they are reflected by said collector electrode.

10. A radioactive battery comprising a cup-shaped emitter electrode having a substantially cylindrical side wall and substantially semi-spherical bottom wall, a coating of radioactive beta emitting material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said beta emitter, emitter electrode, the inner surface of said collector case and said collector plug, and a lead insulated from said collector connected to said emitter and extending therefrom to outside of said case, said predetermined distance being such that beta particles can pass from said emitter through said dielectric material to said collector electrode but backscattered secondary electrons will be absorbed by said dielectric in the event they are reflected by said collector electrode.

11. A radioactive battery comprising a radioactive beta emitter having a cup-like shape having a substantially cylindrical side wall and substantially semi-spherical bottom wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said beta emitter, the inner surface of said collector case and said collector plug, and a lead insulated from said collector connected to said emitter and extending therefrom to outside of said case, said dielectric being bonded together around said emitter, said predetermined distance being such that beta particles can pass from said emitter through said dielectric material to said collector electrode but backscattered secondary electrons will be absorbed by said dielectric in the event they are reflected by said collector electrode.

12. A radioactive battery comprising a cup-shaped emitter electrode having a substantially cylindrical side wall and substantially semi-spherical bottom wall, a coating of radioactive beta emitting material on said emitter electrode, said coating covering said bottom wall and extending part way up said side wall, an electrically conducting collector case enclosing said emitter and spaced a substantially uniform predetermined distance from the outside thereof, an electrically conductive collector plug secured to said case and substantially uniformly spaced said predetermined distance from the inside of said emitter, said case and plug forming a collector electrode, the space between said emitter and said case and between said emitter and said plug being filled with a solid dielectric, said solid dielectric being in close contact with said beta emitter, emitter electrode, the inner surface of said collector case and said collector plug, and a lead insulated from said collector connected to said emitter and extending therefrom to outside of said case, said dielectric being bonded together around said emitter, said predetermined distance being such that beta particles can pass from said emitter through said dielectric material to said collector electrode but backscattered secondary electrons will be absorbed by said dielectric in the event they are reflected by said collector electrode.

13. The method of manufacturing a radioactive battery including the steps of placing a predetermined quantity of a solution containing a radioactive material on a thermoplastic battery element, evaporating the solvent to deposit said radioactive material on the surface of said element, positioning a second thermo-plastic element over said radioactive material, heating said material and elements above the fusion temperature of said elements, and pressing said elements together to bring them into close contact with said material and to bond them to each other around said material.

14. The method of manufacturing a radioactive battery including the steps of placing a predetermined quantity of a solution containing a radioactive material in a cup-shaped thermo-plastic battery element, evaporating the solvent to deposit said radioactive material on the surface of said element, positioning a second cup-shaped thermoplastic element in said first element over said radioactive material, heating said material and elements above the fusion temperature of said elements, and pressing said elements together to bring them into close contact with said material and to bond them to each other around said material.

15. The method of manufacturing a radioactive battery including the steps of positioning a cup-shaped emitter electrode in a cup-shaped thermo-plastic element, placing a predetermined quantity of a solution containing a radioactive material in said electrode, evaporating the solvent to deposit said radioactive material on the surface of said electrode, positioning a second cup-shaped thermo-plastic element in said electrode and first mentioned element, heating said material and elements above the fusion temperature of said elements, and pressing said elements together to bring them into close contact with said electrode and material and to bond them to each other around said electrode.

References Cited in the file of this patent

UNITED STATES PATENTS

| 1,180,732 | Moszkowski | Apr. 25, 1916 |
| 1,364,950 | O'Hara | Jan. 11, 1921 |
| 2,545,606 | Cunningham et al. | Mar. 20, 1951 |

OTHER REFERENCES

Radioisotopic High-Potential Low Current Sources, published by John H. Coleman; Nucleonics (December 1953), vol II, No. 12, pp. 42–45, McGraw-Hill Publishing Co.